(12) United States Patent
Jang

(10) Patent No.: US 8,018,331 B2
(45) Date of Patent: Sep. 13, 2011

(54) MULTILEVEL INVERTER USING CASCADE CONFIGURATION AND CONTROL METHOD THEREOF

(75) Inventor: Han-Keun Jang, Suwon (KR)

(73) Assignee: LS Industrial Systems Co., Ltd., Seoul (KR)

( * ) Notice: Subject to any disclaimer, the term of this patent is extended or adjusted under 35 U.S.C. 154(b) by 869 days.

(21) Appl. No.: 12/038,153

(22) Filed: Feb. 27, 2008

(65) Prior Publication Data

US 2008/0218320 A1    Sep. 11, 2008

(30) Foreign Application Priority Data

Mar. 5, 2007 (KR) .................. 10-2007-0021670

(51) Int. Cl.
*G08B 1/08* (2006.01)
*H04M 11/04* (2006.01)
*H04Q 1/30* (2006.01)

(52) U.S. Cl. ............... 340/538.11; 375/238; 363/37; 363/17; 363/65; 363/71

(58) Field of Classification Search ............ 340/310.12; 375/238; 315/199, 274, 209; 361/603; 363/77, 363/17, 37
See application file for complete search history.

(56) References Cited

U.S. PATENT DOCUMENTS

| | | | |
|---|---|---|---|
| 5,644,483 A * | 7/1997 | Peng et al. ............. | 363/37 |
| 6,014,323 A * | 1/2000 | Aiello et al. ............ | 363/71 |
| 6,229,722 B1 * | 5/2001 | Ichikawa et al. ........ | 363/71 |
| 7,391,180 B2 * | 6/2008 | Armiroli et al. ........ | 318/801 |
| 7,428,158 B2 * | 9/2008 | Bousfield et al. ....... | 363/65 |
| 7,518,886 B1 * | 4/2009 | Lai et al. ............... | 363/17 |
| 2004/0160216 A1 * | 8/2004 | Speranza et al. ....... | 320/140 |
| 2006/0119311 A1 | 6/2006 | Lee | |
| 2006/0255762 A1 | 11/2006 | Yun | |
| 2007/0127170 A1 | 6/2007 | Park | |
| 2007/0152676 A1 | 7/2007 | Lee | |
| 2010/0266875 A1 * | 10/2010 | Somogye et al. ........ | 429/7 |

* cited by examiner

*Primary Examiner* — Benjamin C Lee
*Assistant Examiner* — Peter Mehravari
(74) *Attorney, Agent, or Firm* — Greenblum & Bernstein, P.L.C.

(57) ABSTRACT

A multilevel inverter using a cascade configuration with a device for equally controlling a power factor for each unit cell includes: a master controller, a plurality of power cells connected in series for each of three AC (Alternating Current) phases, a phase shift transformer for supplying a power cell input voltage, a CAN (Controller Area Network) communication network to provide a communication path between the master controller and each power cell, and cell controllers to control output voltages and output frequencies of the respective power cells according to a voltage command and a frequency command from the master controller, each cell controller having a pulse width modulator to generate a pulse width modulation control signal of a variable voltage and a variable frequency to the connected corresponding power cell, wherein each cell controller is configured to calculate a phase difference value of the corresponding power cell according to a preset total number of connected power cells and the floor number (i.e., the serial connection sequence) of the corresponding power cell to thereafter phase-shift a chopping wave by the calculated phase difference value, thereby compensating for the phase differences between each power cell.

6 Claims, 4 Drawing Sheets

MULTILEVEL INVERTER USING CASCADE CONFIGURATION AND CONTROL METHOD THEREOF

BACKGROUND OF THE INVENTION

1. Field of the Invention

The present invention relates to a high voltage inverter, and particularly, to a multilevel inverter using a cascade configuration with a device for equally controlling the power factors of a plurality of power cells, and to a control method thereof.

2. Background of the Invention

In general, a multilevel inverter using a cascade configuration is a multilevel topology of a high voltage and large capacity inverter, in which several is single phase inverters (hereinafter, referred to as power cells or cells) are connected in series for each phase of a three-phase current and accordingly a high voltage can be obtained by using low voltage power semiconductor switches within the power cells.

Thus, a multilevel inverter using a cascade configuration can obtain a high voltage using a semiconductor switch by serially connecting multiple single-phase power cells to each AC (Alternating Current) phase.

Also, a multilevel inverter using a cascade configuration has a feature of a pulse width modulation/phase shift wherein a phase difference is sequentially generated between power cells which are serially connected to one another. Accordingly, the multilevel inverter can have a low rate of output voltage change (dv/dt). In addition, the multilevel inverter using the cascade configuration can obtain reduced total harmonic distortion due to an output voltage with multi levels, namely, many steps.

Further, the multilevel inverter using the cascade configuration rarely incurs a voltage reflection. Accordingly, in spite of a long distance between the multilevel inverter using the cascade configuration and a motor, there is no need for a separate device to prevent the voltage reflection phenomenon.

However, in the multilevel inverter using the cascade configuration, each cell includes an AC-to-DC converter for an AC (Alternating Current) input, composed of a rectifier circuit and a smoothing circuit, independent of each other. Therefore, the multilevel inverter using the cascade configuration requires a separately insulated power source for each power cell, thereby increasing the required provision of secondary windings. Also, the multilevel inverter using the cascade configuration generates a phase difference due to the use of a phase shift transformer having a phase delay for each output, and also changes the phase for each of, for example, 8 power cells with respect to each of the three U, V, W phases due to an inductance component of a load or the like, which causes the power factors, namely, cosine values for the respective phases to be different from one another.

If such power factor difference is ignored, the level of the voltage regenerated in each power cell changes upon controlling a motor to be decelerated. Specifically, for a small load, if the value of the power factor difference is not compensated for, the regeneration voltage is converged in a particular (power) cell, which may cause the corresponding cell to suffer trouble or be burnt out, resulting in that driving of the multilevel inverter using the cascade configuration becomes impossible.

SUMMARY OF THE INVENTION

Therefore, it is an object of the present invention to provide a multilevel inverter using a cascade configuration with a device for equally controlling the power factors for the unit cells thereof, by which occurrence of a convergence of regeneration voltages in a particular cell upon a deceleration of a motor or a small load can be prevented by controlling each cell to have the same power factor.

It is another object of the present invention to provide a method for equally controlling the power factors of unit cells in a multilevel inverter, by which occurrence of a convergence of regeneration voltages in a particular cell upon a deceleration of a motor or a small load can be prevented, by controlling each cell to have the same power factor.

To achieve these and other advantages and in accordance with the purpose of the present invention, as embodied and broadly described herein, there is provided a multilevel inverter using a cascade configuration with a device for equally controlling a power factor of each unit cell, the inverter comprising: a master controller configured to extract a control output from an output voltage and an output frequency according to a set control command; a plurality of power cells connected in series with respect to each phase, each power cell including an AC (Alternating current) converter to convert a three-phase AC input voltage into a DC (Direct Current) output voltage according to the control output from the master controller, a smoothing circuit to smooth the converted DC voltage from the DC converter, and an inverter to generate an AC output voltage using the smoothed DC voltage as an input voltage; a phase shift transformer for supplying a power cell input voltage, the transformer having a primary winding for being connected to a three-phase AC power source, and a plurality of secondary windings correspondingly connected to the power cells; a communication network connected between the master controller and each power cell to provide a communication path therebetween; cell controllers connected to the respective power cells and the master controller so as to control output voltages and output frequencies of the respective connected power cells according to a voltage command and a frequency command from the master controller, and each having a pulse width modulator to generate a chopping wave which is used as a reference for a pulse width modulation in order to generate a pulse width modulation control signal of a variable voltage and variable frequency, thereby providing the generated pulse width modulation control signal to the corresponding connected power cell, wherein each cell controller calculates a phase difference value of the corresponding power cell according to a preset total number of power cells connected to a single phase and a floor number of the corresponding power cell in order to allow the plurality of power cells to have the same power factor, to thereafter phase-shift the chopping wave by the calculated phase difference value, thereby compensating for phase differences between each power cell.

In another aspect of the present invention, there is provided a method for equally controlling a power factor of each unit cell in a multilevel inverter which has a master controller configured to generate and output a control output of an output voltage and an output frequency according to a set control command, a plurality of power cells connected in series with respect to each of three phases and having an inverter which generates an AC output voltage using a DC voltage as an input voltage according to the control output from the master controller, a phase shift transformer for supplying a power cell input voltage, the transformer having a primary winding connected to a three-phase AC power source, and a plurality of secondary windings correspondingly connected to the power cells, a CAN (Control Area Network) communication network connected between the master controller and each power cell to provide a communication path therebetween, and cell controllers connected to the respective power cells and the master controller so as to control output voltages and output frequencies of the respective power cells each having a pulse width modulator to generate a chopping wave which is used as a reference for a pulse width modulation to generate a pulse width modulation control signal of a variable voltage and a variable frequency for thereby providing the generated pulse width modulation control signal to the corresponding connected power cell, wherein each cell controller calculates a phase difference value of the corresponding power cell according to a preset total number of power cells connected to a single phase and a floor number of the corresponding power cell in order to cause the plurality of power cells to all have the same power factor, to thereafter phase-shift the chopping wave by the calculated phase difference value, thereby compensating for phase differences between each power cell, the method comprising: a step of calculating the phase difference of each corresponding power cell using each cell controller according to the preset total number of the power cells connected to a single phase and the floor number (i.e., a serial connection sequence) of the corresponding power cell; and a step of phase-shifting the reference chopping wave of the pulse width modulator of the cell controller by the phase difference value of the corresponding power cell as calculated at the step of calculating the phase difference, so as to cause the plurality of power cells to all have the same power factor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The objects and configurations and operational effects of the present invention to achieve the objects will be understood more clearly from the following description of the preferred embodiments of the present invention with reference to the accompanying drawings.

Figure 1:
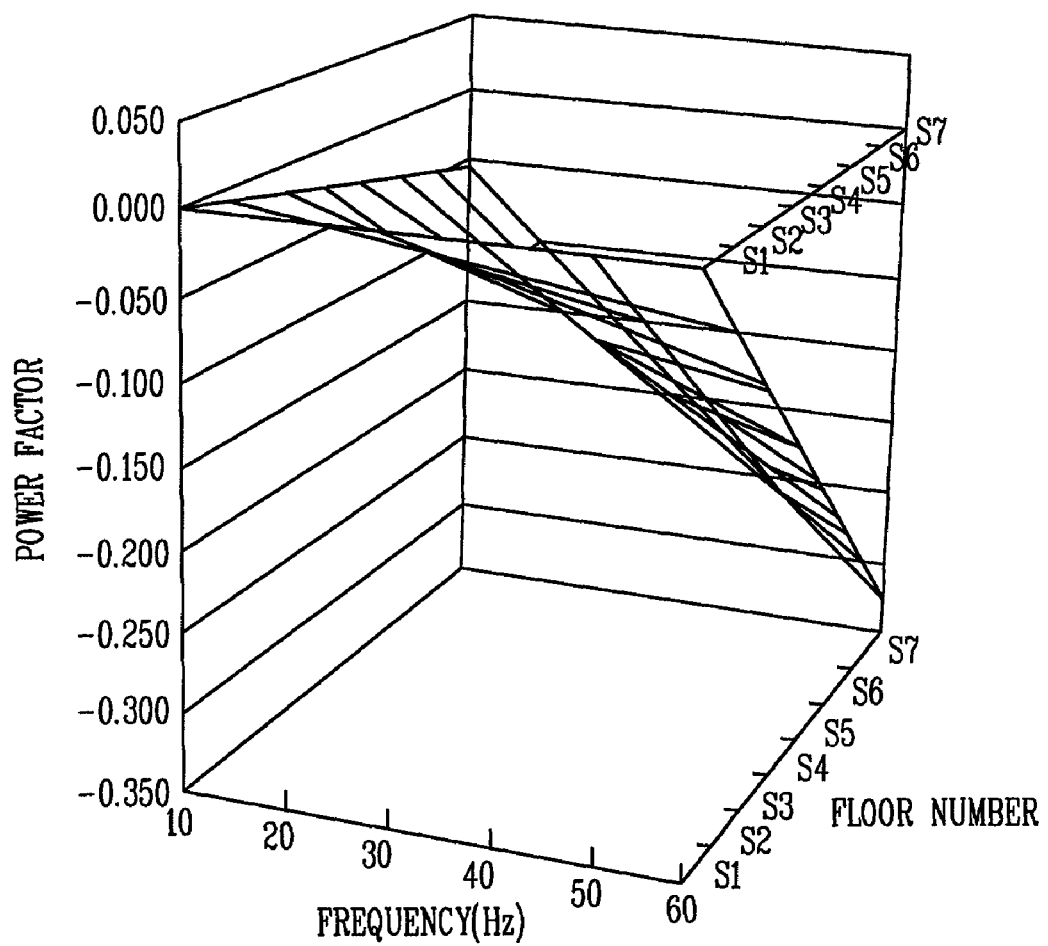
FIG. 1 is a graph showing the interrelation among the output frequency, the floor number of power cells and a power factor, which shows that the power factor changes according to the output frequency and the floor number of the power cells in a multilevel inverter using a cascade configuration.

First, FIG. 1 shows the interrelation among the output frequency, the floor number of a power cell and the power factor, which shows that the power factor changes according to the output frequency and the floor number of the power cell in a multilevel inverter using a cascade configuration.

As shown in FIG. 1, it can be seen that as the output frequency becomes higher, the power factor of a power cell decreases. It can also be seen that the power factor decreases, according to the floor numbers of serially connected power cells for each phase of a three-phase AC (Alternating Current), namely, as the floor number (i.e., the connected sequence) becomes farther away from the input power source.

On the other hand, description will be given with reference to FIG. 2 which shows a communication configuration between a master controller and a plurality of power cells and cell controllers connected to each power cell, and a detailed configuration of a representative power cell of the power cells in a multilevel inverter using a cascade configuration according to the present invention.

Figure 2:
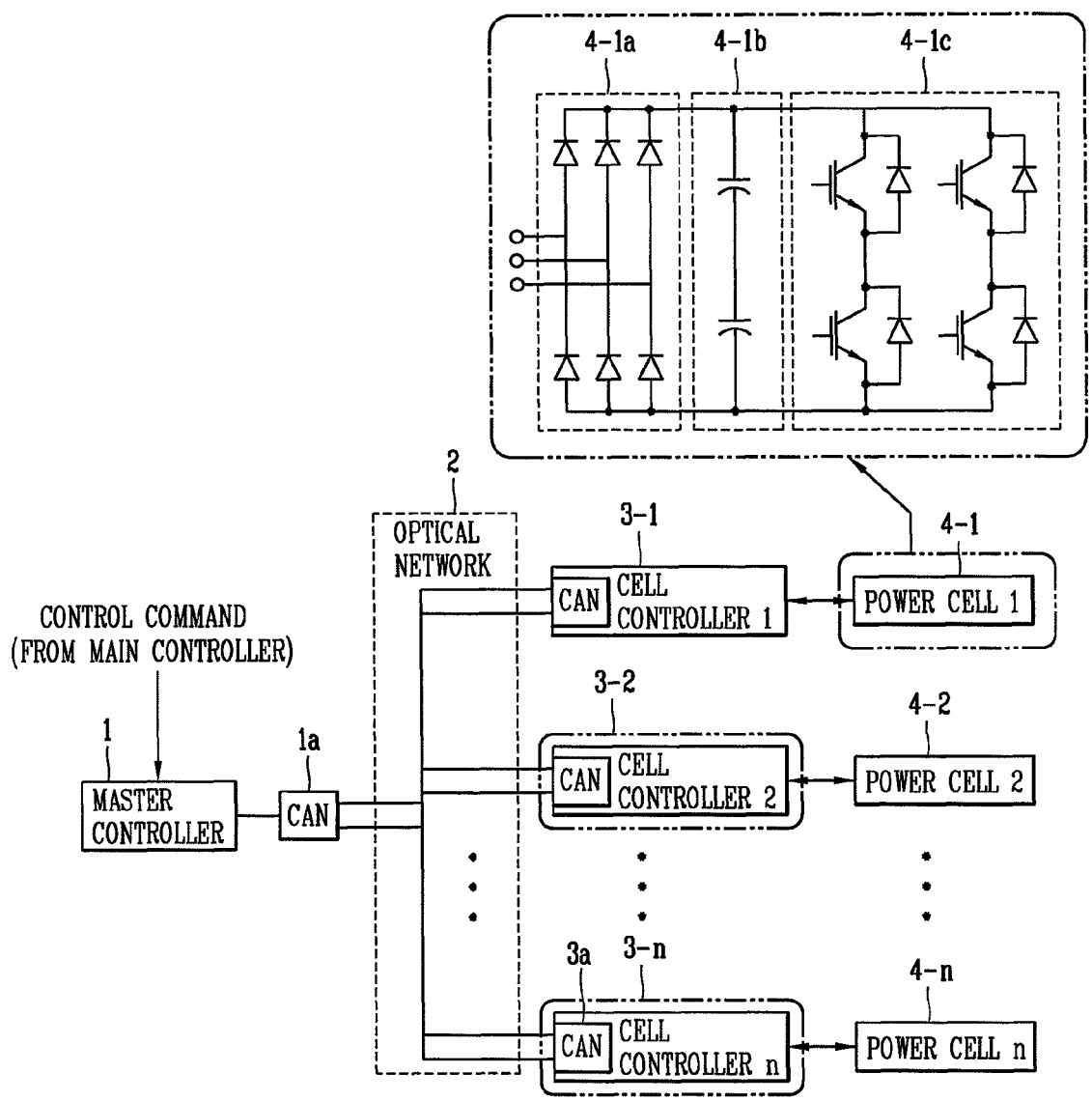
FIG. 2 is a schematic block diagram showing a communication configuration among a master controller, a plurality of power cells and cell controllers connected to respective power cells in a multilevel inverter using a cascade configuration in accordance with the present invention.

As shown in FIG. 2, the communication configuration between a master controller and a plurality of power cells and between cell controllers connected to the respective power cells in the multilevel inverter using a cascade configuration may comprise a master controller 1, a CAN (Controller Area Network) driver 1a shown at one side of the master controller 1, installed in the master controller 1 or separately connected to the master controller 1, a plurality of cell controllers 1~n (i.e., 3-1~3-n), a CAN driver 3a shown at one side of each cell controller 1~n (i.e., 3-1~3-n), installed in the master controller 1 or separately connected to the master controller 1, an optical network 2 connected between the master controller 1 and the cell controllers 1~n (i.e., 3-1~3-n), specifically, between the CAN driver 1a at the side of the master controller 1 and the CAN drivers 3a at the side of each cell controller 1~n (i.e., 3-1~3-n), and a plurality of power cells 1~n (i.e., 4-1~4-n) respectively connected to the cell controllers 1~n (i.e., 3-1~3-n) via buses.

In FIG. 2, the master controller 1 may receive from a main controller (not shown) a control command, a velocity command value preset by a user and an acceleration/deceleration time, and then generate and output a control output of an output voltage and an output frequency to each of the cell controllers 1~n (i.e., 3-1~3-n).

Still referring to FIG. 2, in the multilevel inverter using the cascade configuration according to the present invention, each power cell 1~n (i.e., 4-1~4-n) may include, as shown in an exemplary detailed configuration for the power cell 1 (4-1) (within the double dashed line), a rectifier circuit portion 4-1a, a smoothing circuit portion 4-1b and an inverter circuit portion 4-1c.

Figure 3:
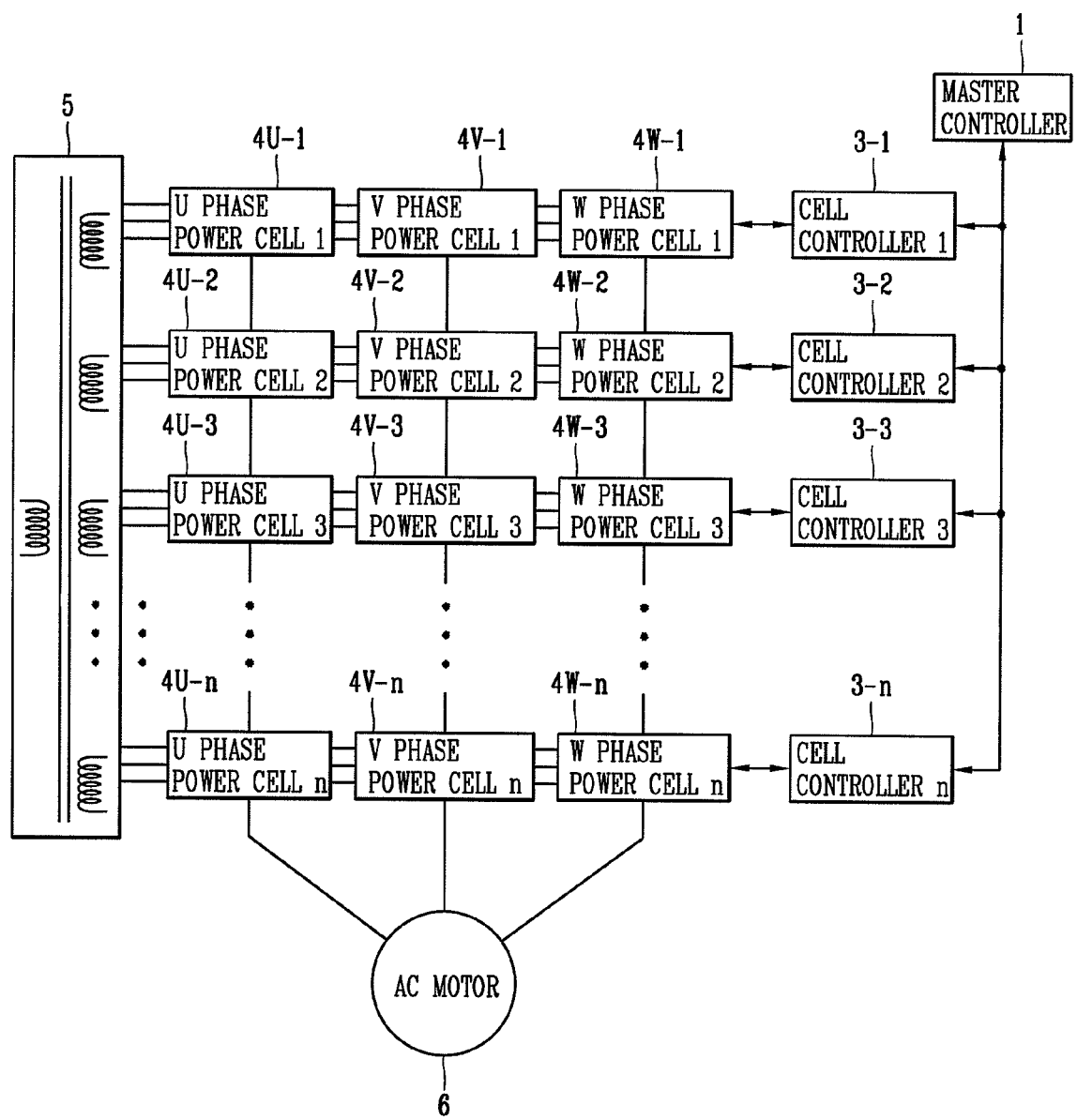
FIG. 3 is a schematic block circuit diagram showing a circuit configuration including a master controller, a plurality of power cells, cell controllers connected to respective power cells, a phase shift transformer to supply an input voltage to a motor and the power cells.

The rectifier circuit portion 4-1a may be implemented as a diode bridge which rectifies an AC input voltage from a phase shift transformer 5 shown in FIG. 3, to output a DC input voltage accordingly.

The smoothing circuit portion 4-1b may be implemented as a capacitor(s) which is connected to the output terminals of the rectifier circuit portion 4-1*a* to smooth the DC input voltage outputted by the rectifier circuit portion 4-1*a*.

The inverter circuit portion 4-1*c* may be implemented as power semiconductor switches, for example, a pair of thyristors or a pair of IGBTs (Insulated Gate Bipolar Transistors), which are connected to the output terminals of the smoothing circuit portion 4-1*b* and controlled by the cell controller 3-1 to be alternately switched on and off with a phase difference from each other.

Further referring to FIG. 2, the cell controllers 1~*n* (i.e., 3-1~3-*n*) are connected to the corresponding power cells 1~*n* (i.e., 4-1~4-*n*), and connected to the master controller 1 via the CAN drivers 3*a* at the side of the cell controllers, the optical network 2 and the CAN driver 1*a* at the side of the master controller 1, so as to control output voltages and output frequencies of the corresponding power cells 1~*n* (i.e., 4-1~4-*n*) according to a voltage command and a frequency command received from the master controller 1.

Still referring to FIG. 2, the multilevel inverter using the cascade configuration may use a CAN (Controller Area Network) as a communication protocol between the master controller 1 and the plurality of cell controllers 1~*n* (i.e., 3-1~3-*n*), and an optical fiber network as a communication medium, thereby ensuring strength against noise and good insulation characteristics.

Next, description will be given as follows with reference to FIG. 3 which is a schematic block diagram showing a circuit configuration comprising a master controller, a plurality of power cells, cell controllers connected to the respective power cells, and a phase shift transformer to supply input voltages to a motor and the power cells.

FIG. 3 shows a connection between an AC motor as a load and power cells for each phase of a three-phase AC supply, and a configuration including, as a main component, a phase shift transformer to supply an AC input voltage to each power cell, in a multilevel inverter using a cascade configuration according to the present invention.

As shown in FIG. 3, the phase shift transformer 5 is a transformer which includes a primary winding connected to a three-phase AC power source, and a plurality of secondary windings connected to power cells for each phase to supply induced AC voltages as input voltages to the power cells for each phase, the induced AC voltages being induced from the primary winding and having different phases from one another.

Referring to FIG. 3, the power cells may include U-phase power cells of three phases connected to one another in series (i.e., U-phase power cells 1~*n* (4U-1~4U-*n*)), V-phase power cells of three phases connected to one another in series (i.e., V-phase power cells 1~*n* (4V-1~4V-*n*)), and W-phase power cells of three phases connected to one another in series (i.e., W-phase power cells 1~*n* (4W-1~4W-*n*)).

Still referring to FIG. 3, the AC motor 6 represents a load which is driven by receiving the combined output voltages of the serially connected power cells for each phase, namely, the combined U-phase output voltage of the U-phase power cells 1~*n* (4U-1~4U-*n*), the combined V-phase output voltage of the V-phase power cells 1~*n* (4V-1~4V-*n*), and the combined W-phase output voltage of the W-phase power cells 1~*n* (4W-1~4W-*n*).

The basic configuration and functions of the master controller 1 and the cell controllers 1~*n* (3-1~3-*n*) are the same as described with reference to FIG. 2, and thus will not be repeated. The detailed configuration and operation of the cell controllers 1~*n* (3-1~3-*n*) of the present invention will be described as follows. In other words, hereinafter, description will be provided in more detail of the detailed configuration and operation of the cell controllers as devices for equally controlling the power factors for the unit cells, whereby a regeneration voltage can be prevented from being converged in a particular cell upon the deceleration of a motor or a small load by controlling each unit cell to have the same power factor.

The method for equally controlling a power cell of each unit cell performed by the cell controllers according to the present invention may roughly comprise calculating a phase difference of a unit cell (i.e., a power cell to which a cell controller is connected for control) based upon information related to the corresponding power cell (i.e., information related to a preset number of total power cells connected for a single phase and information related to a floor number (a serial connection sequence)) of the corresponding power cell, and shifting the phase of a reference chopping wave (a so-called carrier wave) for generating a pulse width modulation signal of a pulse width modulator installed in the cell controller as much as the calculated phase difference of the corresponding power cell.

First, the calculation of the phase difference of the corresponding power cell may be performed according to the following calculation formula (1).

$$\alpha = (180°/2n) + \{(180°/n) \times (\text{a floor number of corresponding power cell} - 1)\} \quad \text{Formula (1)}$$

where α denotes the phase difference, i.e., the phase angle of the corresponding power cell, n denotes the preset number of total power cells for a single phase (i.e., the corresponding phase), and the floor number of the corresponding power cell denotes the number of the floor of the corresponding power cell (i.e., the serial connection sequence), namely, a preset stored value.

Therefore, if it is assumed that the corresponding power cell is a first V-phase power cell (e.g., the power cell 1 (4V-1) remotest from the AC motor in FIG. 3) and a total of 8 power cells are connected for each phase, the floor number of the first V-phase power cell becomes 1 because it is the first one for the corresponding phase. Thus, the phase difference would be 11.25 according to formula (1) (i.e., 180°/16=11.25).

As another example, if the corresponding power cell is the third W-phase power cell (i.e., 4W-3 in FIG. 3) and 8 power cells are connected for each phase, the floor number of the third W-phase power cell (4W-3) becomes 3 because it is the third one for the corresponding phase. Accordingly, the phase difference would be 56.25 according to formula (1) (i.e., 180°/16 30 {180°/8×(3−1)}=56.25)

That is, in the present invention, the cell controller 3-1~3-*n* calculates the phase difference α of the corresponding power cell according to a calculation formula such as formula (1).

Hereinafter, description will be given for the step of phase-shifting the reference chopping wave (so-called carrier wave) which is used to generate the pulse width modulation signal in the pulse width modulator installed in each cell controller by as much as the calculated phase difference of the corresponding power cell.

Figure 4:
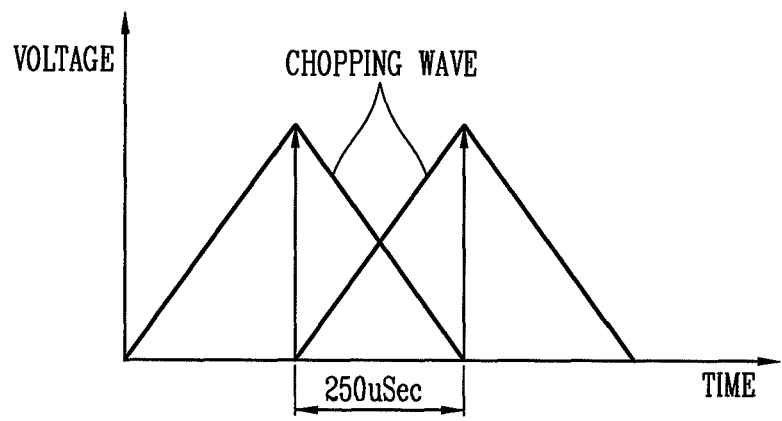
FIG. 4 is a waveform diagram showing that power cells are controlled to have the same power factor for each AC current phase by phase-shifting reference chopping waves, which are used to generate a pulse width modulation signal in a pulse width modulator installed in each cell controller, as much as a phase difference of a corresponding power cell obtained by a calculation formula.

Each cell controller 3-1~3-*n* controls an output voltage and an output frequency of the power cell according to a voltage command and a frequency command from the master controller (referring to reference numeral 1 in FIG. 3), and then provides a pulse width modulation control signal of a variable voltage and a variable frequency to the connected power cell. To this end, each cell controller 3-1~3-*n* may be provided with a pulse width modulator which generates a chopping wave used as a reference for a pulse width modulation. The chopping wave can be seen in FIG. 4. As shown in FIG. 4, if the phase difference α of the corresponding power cell is 250 μs, the pulse width modulator of each cell controller 3-1~3-n shifts the phase of the reference chopping wave by 250 μs. Ultimately, Φ of cos Φ, namely, the phase angle becomes the same with respect to the plurality of power cells for each phase. Therefore, the power factor, namely, the vale of cos Φ becomes the same with respect to each power cell.

Such a circuit and hardware configuration of the cell controllers as shown in FIG. 4 may be implemented by including a chopping wave oscillating circuit, a phase shifter to shift the phase of a chopping wave by a command angle, a microprocessor to command an angle to the phase shifter using an operation control program and stored information such that the phase shifter can shift the phase by the necessary angle, a memory (e.g., a ROM (Read Only Memory or a flash memory) to store a calculation formula to obtain the phase difference α and a program which controls the phase shifter to shift the phase by the calculated phase difference α, and to store the preset phase and floor number of a corresponding power cell.

Therefore, the AC input voltage applied from the phase shift transformer 5 in FIG. 3 is rectified and smoothed by the rectifier circuit portion 4-1a and the smoothing circuit portion 4-1b of the corresponding power cell as shown in FIG. 2, so as to be converted into a DC input voltage. The converted DC input voltage is then converted into an AC output voltage with a desired voltage and frequency by the inverter circuit portion 4-1c. Such AC output voltage is combined by each phase of U, V and W. Finally, a high AC voltage is applied to the motor as a driving voltage.

Figure 5:
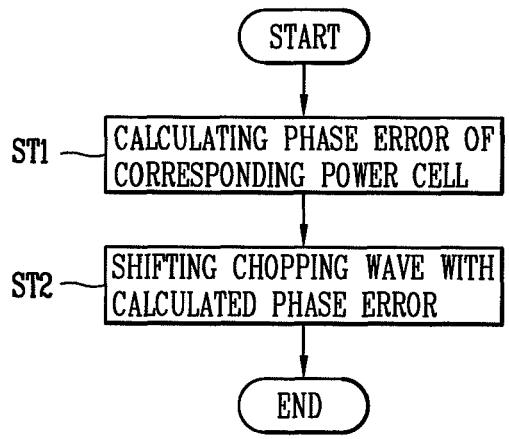
FIG. 5 is a flowchart showing an operation of equally controlling a power cell of each unit cell in a multilevel inverter using a cascade configuration and sequential steps of a method thereof according to the present invention.

Next, FIG. 5 is a flowchart showing the operation of the multilevel inverter using the cascade configuration and a control method thereof according to the present invention, which will be described hereafter.

The method for controlling the multilevel inverter according to the present invention may comprise a phase difference calculating step for a power cell (ST1) in which a cell controller is used to calculate a phase difference value of the corresponding power cell of a predetermined total number of power cells connected to a single phase and a floor number (e.g., a serial connection sequence) of the corresponding power cell, and a reference chopping wave phase shifting step (ST2) in which the phase of a chopping wave of the pulse width modulator in the cell controller is shifted by the phase difference value of the corresponding power cell obtained in the step ST1 such that power factors of the plurality of power cells can be made the same.

That is, in the step ST1, the cell controller 3-1~3-n calculates the phase difference of a power cell by the calculation formula (1) among the total number of power cells connected to a single phase, the preset total number of power cells having been stored, and the floor number (i.e., the serial connection sequence) of the corresponding power cell.

At the step ST2 (i.e., the step of shifting the phase of the reference chopping wave), the cell controller 3-1~3-n shifts the phase of the reference chopping wave of the pulse width modulator of the cell controller by the phase difference value of the corresponding power cell, the value obtained at the step ST1 (i.e., the step of calculating the phase difference), such that the plurality of power cells can all have the same power factor.

As described above, in the multilevel inverter using the cascade configuration according to the present invention, respective cell controllers can control the different power factors which are generated at output frequencies and serially-connected locations (floors) of respective power cells to become the same. Accordingly, upon the deceleration of a motor or a small load, it is possible to prevent a regeneration voltage from being converged into a particular cell, resulting in avoiding the particular cell from being disordered or damaged.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within the scope as defined in the appended claims, and therefore all changes and modifications that fall within the metes and bounds of the claims, or equivalents of such metes and bounds are therefore intended to be embraced by the appended claims.

What is claimed is:

1. A multilevel inverter using a cascade configuration with a device for equally controlling a power factor of each unit cell, the inverter comprising:
  a master controller configured to extract a control output from an output voltage and an output frequency according to a set control command;
  a plurality of power cells connected in series with respect to each phase, each power cell including an AC (Alternating current) converter that converts a three-phase AC input voltage into a DC (Direct Current) output voltage according to the control output from the master controller, a smoothing circuit that smoothes the converted DC voltage from the DC converter, and an inverter that generate an AC output voltage using the smoothed DC voltage as an input voltage;
  a phase shift transformer that supplies a power cell input voltage, the transformer having a primary winding connected to a three-phase AC power source, and a plurality of secondary windings correspondingly connected to each of the plurality of power cells;
  a communication network connected between the master controller and each of the plurality of power cells to provide a communication path therebetween;
  cell controllers connected to each of the plurality of power cells and the master controller and configured to control output voltages and output frequencies of each of the connected plurality of power cells according to a voltage command and a frequency command from the master controller, each cell controller comprising a pulse width modulator that generates a chopping wave as a reference for a pulse width modulation so as to generate a pulse width modulation control signal of a variable voltage and variable frequency, and provides the generated pulse width modulation control signal to the respective connected power cell, wherein each cell controller calculates a phase difference value of the respective connected power cell according to a preset total number of the plurality of power cells connected to a single phase and a floor number of the respective connected power cell so that each of the plurality of power cells to have the same power factor, and to phase-shift the chopping wave by the calculated phase difference value, to compensate for phase differences between each of the plurality of power cells.

2. The multilevel inverter of claim 1, wherein the cell controller is configured to calculate the phase difference value by a calculation formula, wherein the phase difference value=(180°/2$n$)+{(180°/$n$)×{(180°/$n$)×[(the floor number of the corresponding power cell)−1]}, where n denotes the total number of power cells for a single phase.

3. The multilevel inverter of claim 1, wherein the communication network comprises a CAN (Controller Area Network) as a communication protocol, and an optical fiber network as a communication medium.

4. A method for equally controlling a power factor of each unit cell in a multilevel inverter which has a master controller configured to generate and output a control output of an output voltage and an output frequency according to a set control command, a plurality of power cells connected in series with respect to each of three phases and having an inverter which generates an AC output voltage using a DC voltage as an input voltage according to the control output from the master controller, a phase shift transformer that supplies a power cell input voltage, the transformer having a primary winding connected to a three-phase AC power source, and a plurality of secondary windings correspondingly connected to the plurality of power cells, a communication network connected between the master controller and each power cell of the plurality of power cells to provide a communication path therebetween, and cell controllers connected to each of the plurality of power cells and the master controller and configured to control output voltages and output frequencies of each of the connected plurality of power cells, each cell controller comprising a pulse width modulator that generates a chopping wave as a reference for a pulse width modulation so as to generate a pulse width modulation control signal of a variable voltage and a variable frequency, and provides the generated pulse width modulation control signal to the respective connected power cell, wherein each cell controller calculates a phase difference value of the respective connected power cell according to a predetermined total number of the plurality of power cells connected to a single phase and a floor number of the respective connected power cell so that each of the plurality of power cells have the same power factor, and to phase-shift the chopping wave by the calculated phase difference value, to compensate for phase differences between each of the plurality power cells, the method comprising:

calculating the phase difference value of each connected power cell using each cell controller according to the predetermined total number of the plurality of power cells connected to a single phase and the floor number of the respective connected power cell, the floor number being a serial connection sequence; and phase-shifting the reference chopping wave of the pulse width modulator of the cell controller by the phase difference value of the respective connected power cell as calculated by the calculating of the phase difference value, so that each of the plurality of power cells have the same power factor.

5. The method of claim 4, wherein the phase difference of the corresponding power cell is calculated by a calculation formula, wherein the phase difference value=(180°/2$n$)+{(180°/$n$)×{(180°/$n$)×[(the floor number of the corresponding power cell)−1]}, where n denotes the total number of power cells for a single phase.

6. The method of claim 4, wherein the communication network comprises a CAN (Controller Area Network) as a communication protocol and an optical fiber network as a communication medium.

* * * * *